US010545367B2

(12) United States Patent
Lee et al.

(10) Patent No.: US 10,545,367 B2
(45) Date of Patent: Jan. 28, 2020

(54) PRESSURE SENSITIVE ADHESIVE COMPOSITION

(71) Applicant: LG Chem, Ltd., Seoul (KR)

(72) Inventors: Min Ki Lee, Daejeon (KR); Sung Soo Yoon, Daejeon (KR); Su Jeong Kim, Daejeon (KR); Sang Hyun Hong, Daejeon (KR); Jeong Ae Yoon, Daejeon (KR); Han Na Chi, Daejeon (KR)

(73) Assignee: LG Chem, Ltd. (KR)

( * ) Notice: Subject to any disclaimer, the term of this patent is extended or adjusted under 35 U.S.C. 154(b) by 275 days.

(21) Appl. No.: 15/022,357

(22) PCT Filed: Nov. 26, 2014

(86) PCT No.: PCT/KR2014/011402
§ 371 (c)(1),
(2) Date: Mar. 16, 2016

(87) PCT Pub. No.: WO2015/080456
PCT Pub. Date: Jun. 4, 2015

(65) Prior Publication Data
US 2016/0230054 A1    Aug. 11, 2016

(30) Foreign Application Priority Data

Nov. 26, 2013 (KR) .................. 10-2013-0144607
Nov. 26, 2014 (KR) .................. 10-2014-0166085

(51) Int. Cl.
| C09J 153/00 | (2006.01) |
| G02F 1/1335 | (2006.01) |
| G02B 1/14 | (2015.01) |
| G02B 5/30 | (2006.01) |

(52) U.S. Cl.
CPC ......... *G02F 1/133528* (2013.01); *G02B 1/14* (2015.01); *G02B 5/3033* (2013.01); *C09J 2201/122* (2013.01); *C09J 2201/606* (2013.01); *C09J 2203/318* (2013.01); *C09J 2453/00* (2013.01)

(58) Field of Classification Search
None
See application file for complete search history.

(56) References Cited

U.S. PATENT DOCUMENTS

| | | | |
|---|---|---|---|
| 6,432,475 B1 | 8/2002 | Yamamoto et al. | |
| 7,255,920 B2 | 8/2007 | Everaerts et al. | |
| 9,428,675 B2* | 8/2016 | Chi | ............ G02B 1/10 |
| 9,738,819 B2* | 8/2017 | Chi | .......... C09J 153/00 |
| 9,777,194 B2* | 10/2017 | Lee | ............ C09J 7/0221 |
| 9,798,056 B2* | 10/2017 | Lee | ............ G02B 5/3025 |
| 9,834,709 B2* | 12/2017 | Kim | .......... C09J 153/00 |
| 2004/0097658 A1* | 5/2004 | Everaerts | ........ C08F 293/005 |
| | | | 525/244 |
| 2004/0260030 A1 | 12/2004 | Husemann et al. | |
| 2009/0104445 A1* | 4/2009 | Inoue | ............ C09D 133/26 |
| | | | 428/355 N |
| 2009/0275705 A1* | 11/2009 | Fujita | ............ C08F 293/00 |
| | | | 525/342 |
| 2010/0227969 A1* | 9/2010 | Zhu | ............ C07D 203/18 |
| | | | 524/560 |
| 2011/0043737 A1 | 2/2011 | Kim et al. | |
| 2011/0116022 A1* | 5/2011 | Jang | ............ C08L 75/00 |
| | | | 349/96 |
| 2014/0242303 A1* | 8/2014 | Lee | ............ G02B 5/3025 |
| | | | 428/1.55 |
| 2018/0282589 A1* | 10/2018 | Chi | ............ C09J 7/387 |

FOREIGN PATENT DOCUMENTS

| EP | 2426153 A1 | 3/2012 |
| EP | 2857472 A1 | 4/2015 |
| EP | 2947129 A1 | 11/2015 |
| EP | 2993194 A1 | 3/2016 |
| EP | 3012305 A1 | 4/2016 |
| JP | 07-082542 A | 3/1995 |
| JP | 11-116644 A | 4/1999 |

(Continued)

OTHER PUBLICATIONS

Kim No Ma et al., "Pressure-Sensitive Adhesive Composition, Polarizers, and Liquid Crystal Display Comprising the Same", machine translation of KR2010-0011179A, published Mar. 2, 2010.*
Hasegawa Hiroaki et al., "Block Copolymers and Its Polymerization", machine translation of JP 11-116644A, published Apr. 27, 1999.*
Taku, Miyashita, "Acrylic copolymer, acrylic adhesive composition, acrylic adhesive tape or sheet and acrylic adhesive composition", english translation of JP 2001-131250A, published May 15, 2001 (Year: 2001).*
Shoko Sugino et al., "Transparent conductive fim with adhesive layer, manufacturing method thereof, and touch panel", english translation of JP 2013-054516A, published Mar. 21, 2013 (Year: 2013).*

(Continued)

*Primary Examiner* — Anish P Desai
(74) *Attorney, Agent, or Firm* — Lerner, David, Littenberg, Krumholz & Mentlik, LLP

(57) ABSTRACT

The present invention relates to a pressure-sensitive adhesive composition, an optical member, a polarizing plate, and a display device. The pressure-sensitive adhesive composition according to an embodiment of the present invention may form a pressure-sensitive adhesive which has excellent general physical properties such as coating properties, endurance reliability, or the like, and which may stably maintain the physical properties for the long term. Further, the pressure-sensitive adhesive composition may be particularly applied to various optical films, thereby forming the pressure-sensitive adhesive layer which exhibits excellent adhesion with the optical film, and when the pressure-sensitive adhesive composition is applied to the polarizing plate, bending properties may be effectively prevented.

13 Claims, No Drawings

(56) References Cited

FOREIGN PATENT DOCUMENTS

| | | |
|---|---|---|
| JP | 2001-131250 A | 5/2001 |
| JP | 2009079120 A | 4/2009 |
| JP | 2012077299 A | 4/2012 |
| JP | 2012137723 A | 7/2012 |
| JP | 2013-054516 A | 3/2013 |
| JP | 2013-054517 | 3/2013 |
| JP | 2013-082772 A | 5/2013 |
| JP | 2013142131 A | 7/2013 |
| KR | 10-1023839 B1 | 3/2011 |
| KR | 10-1171976 B1 | 8/2012 |
| KR | 10-1171977 B1 | 8/2012 |
| TW | 200936724 A | 9/2009 |
| TW | 201100485 A | 1/2011 |
| WO | WO 2013180524 A1 * 12/2013 ........... G02B 5/3025 |

OTHER PUBLICATIONS

Definition "Homopolymer", Merriam-Webster dictionary, Apr. 10, 2019 (Year: 2019).*

Supplementary European Search Report for Application No. EP14865741 dated Jun. 19, 2017.

International Search Report for Application No. PCT/KR2014/011402 dated Feb. 26, 2015.

Taiwanese Search Report for Application No. 103141020 dated Oct. 20, 2015.

* cited by examiner

PRESSURE SENSITIVE ADHESIVE COMPOSITION

CROSS-REFERENCE TO RELATED APPLICATION

The present application is a national phase entry under 35 U.S.C. § 371 of International Application No. PCT/KR2014/011402, filed Nov. 26, 2014, which claims priority from Korean Patent Application No. 10-2013-0144607, filed Nov. 26, 2013, and Korean Patent Application No. 10-2014-0166085, filed Nov. 26, 2014, all of which are incorporated herein by reference.

BACKGROUND

1. Field of the Invention The present invention relates to a pressure-sensitive adhesive composition, an optical member, a polarizing plate, and a display device.

2. Discussion of Related Art

Various optical films are used as components of a display device. For example, a liquid crystal display device (hereinafter, referred to as an "LCD device") which is a representative display device generally includes a liquid crystal panel having a liquid crystal composition injected between two transparent substrates, and an optical film. As the optical film, a polarizing film, a retardation film, a brightness enhancement film, or the like is used, and a pressure-sensitive adhesive for the optical film is largely used to laminate the above-described optical films, or to attach the optical films to an adherend such as the liquid crystal panel.

Main physical properties required for the pressure-sensitive adhesive composition for the optical film include a cohesive force, pressure-sensitive adhesive force, reworkability, low light leakage properties, stress relaxation properties, etc.

The pressure-sensitive adhesive compositions to achieve the above-described physical properties are proposed in Patent Documents 1 to 3. However, the adhesion between the pressure-sensitive adhesive layer and the optical film does not receive attention in the patent documents.

PATENT DOCUMENT

Patent Document 1: Korean Patent Publication No. 1023839

Patent Document 2: Korean Patent Publication No. 1171976

Patent Document 3: Korean Patent Publication No. 1171977

SUMMARY OF THE INVENTION

The present invention is directed to providing a pressure-sensitive adhesive composition, an optical member, a polarizing plate, and a display device.

According to an aspect of the present invention, an exemplary pressure-sensitive adhesive composition may include a block copolymer. The term "block copolymer" used in the present specification may refer to a copolymer including blocks of different polymerized monomers.

In an embodiment of the present invention, the block copolymer may include a first block having a glass transition temperature of 50° C. or more, and a second block having a glass transition temperature of −10° C. or less. In the embodiment of the present invention, a "glass transition temperature of a predetermined block" in the present specification may denote a glass transition temperature measured or calculated from a polymer only formed of monomers included in the block. The first block may have a glass transition temperature, for example, of 60° C. or more, 65° C. or more, or 70° C. or more. The upper limit of the glass transition temperature of the first block is not particularly limited, but may be, for example, about 150° C., 140° C., 130° C., or 120° C. A glass transition temperature of the second block may be, for example, −20° C. or less, −30° C. or less, −35° C. or less, or −40° C. or less. The lower limit of the glass transition temperature of the second block is not particularly limited, but may be, for example, about −80° C., −70° C., −60° C., −55° C., or −50° C.

The block copolymer including the first block and second block having the glass transition temperature in the above-described range may form a fine phase separation structure within the pressure-sensitive adhesive. A pressure-sensitive adhesive including the above-described phase separation structure has a suitable level of a cohesive force and stress relaxation properties, and exhibits excellent endurance reliability, light leakage suppression performance properties, reworkability, and the like.

In the block copolymer, a molecular weight of the first block, in other words, the block having a relatively high glass transition temperature, may be adjusted. For example, a number average molecular weight (Mn) of the first block may be adjusted in the range of 2,500 to 100,000. The term "number average molecular weight of the first block", for example, may denote a number average molecular weight of a polymer prepared by only polymerizing monomers forming the first block. The "number average molecular weight" mentioned in the present specification, for example, may be measured by a general method using GPC (Gel permeation chromatography). In another embodiment of the present invention, the first block may have a number average molecular weight of about 5,000 to 75,000, or 10,000 to 50,000. Further, the first block may have a molecular weight distribution (PDI; Mw/Mn), in other words, a ratio (Mw/Mn) of a weight-average molecular weight (Mw) and a number average molecular weight (Mn), in the range of about 1.0 to 2.0, 1.1 to 1.75, or 1.2 to 1.5. When molecular weight properties of the first block, in other words, the block having a relatively high glass transition temperature, are adjusted in the above-described range, the pressure-sensitive adhesive composition or pressure-sensitive adhesive having excellent physical properties may be provided.

The block copolymer may have a number average molecular weight in the range of 10,000 to 300,000. In another embodiment of the present invention, the number average molecular weight of the block copolymer may be in the range of about 25,000 to 250,000, 50,000 to 200,000, or 75,000 to 180,000. Further, the block copolymer may have a molecular weight distribution in the range of about 1.0 to 2.5, 1.2 to 2.5, or 1.4 to 2.5. When the block copolymer has the above-described molecular weight properties, the pressure-sensitive adhesive composition or pressure-sensitive adhesive having excellent physical properties may be provided.

The block copolymer may be a crosslinkable copolymer having a crosslinkable functional group. In the present specification, the term "crosslinkable functional group" may refer to a functional group which is provided in a side chain or end of a polymer, and at least capable of reacting with a functional group of a crosslinking agent which will be described below. Examples of the crosslinkable functional groups may include a hydroxy group, a carboxyl group, an isocyanate group, a glycidyl group, etc. The hydroxy group or carboxyl group may be generally used as the crosslinkable functional group, and the hydroxy group may be suitably used in the embodiment of the present invention, but the crosslinkable functional group is not limited thereto.

When the crosslinkable functional group is included in the block copolymer, the crosslinkable functional group, for example, may be included in the block having a relatively low glass transition temperature, in other words, the second block.

In the embodiment of the present invention, the crosslinkable functional group may not be included in the first block, and only included in the second block. When the crosslinkable functional group is included in the second block having a relatively low glass transition temperature, the pressure-sensitive adhesive exhibiting a proper cohesive force and stress relaxation properties, and thus allowing physical properties such as endurance reliability, light leakage suppression performance properties, reworkability, and the like to be excellently maintained may be formed.

In the block copolymer, types of monomers forming the first or second block are not particularly limited as long as the glass transition temperature as described above is ensured by a combination of each monomer.

The first block, for example, may include a polymerization unit derived from a methacrylic acid ester monomer. That a "monomer is included as a polymerized unit in a polymer or block" may denote that the monomer forms a frame, for example, a main chain or side chain of the polymer or block through a polymerization reaction in the present specification. As the (meth)acrylic acid ester monomer, for example, an alkyl (meth)acrylate may be used. In consideration of a cohesive force, a glass transition temperature, and pressure-sensitive adhesive properties, an alkyl (meth)acrylate having an alkyl group with 1 to 20 carbon atoms, 1 to 16 carbon atoms, 1 to 12 carbon atoms, 1 to 8 carbon atoms, or 1 to 4 carbon atoms may be used. In the above description, the alkyl group may have a straight chain, branched chain, or ring shape. Examples of the monomers may include methyl(meth)acrylate, ethyl(meth)acrylate, n-propyl(meth)acrylate, isopropyl(meth)acrylate, n-butyl(meth)acrylate, t-butyl(meth)acrylate, sec-butyl (meth)acrylate, pentyl(meth)acrylate, 2-ethylhexyl(meth) acrylate, 2-ethylbutyl(meth)acrylate, n-octyl(meth)acrylate, isobornyl(meth)acrylate, isooctyl(meth)acrylate, isononyl (meth)acrylate, lauryl(meth)acrylate, and the like, and one type or two or more types thereof may be selected and used such that the glass transition temperature is ensured.

In consideration of easy control of the glass transition temperature, examples of the monomers forming the first block may include a methacrylic acid ester monomer such as an alkyl methacrylate from the above-described monomers, for example, an alkyl methacrylate having an alkyl group with 1 to 20 carbon atoms, 1 to 16 carbon atoms, 1 to 12 carbon atoms, 1 to 8 carbon atoms, or 1 to 4 carbon atoms.

The second block may include, for example, a range of 90 to 99.9 parts by weight of a polymerization unit of an alkyl (meth)acrylate, and a range of 0.1 to 10 parts by weight of a polymerization unit of a copolymerizable monomer having a crosslinkable functional group. The unit "parts by weight" used in the present specification may denote a weight ratio between the monomers. For example, that the second block includes a range of 90 to 99.9 parts by weight of a polymerization unit of alkyl(meth)acrylate, and a range of 0.1 to 10 parts by weight of a polymerization unit of a copolymerizable monomer having a crosslinkable functional group may denote that a ratio (A:B) based on the weights of the alkyl (meth)acrylate (A) and the copolymerizable monomer (B) having a crosslinkable functional group which form a polymerized unit of the second block is in the range of 90 to 99.9:0.1 to 10. When the weight ratio is in the above-described range, physical properties, for example, adhesive force and durability of the pressure-sensitive adhesive may be excellently maintained.

As the alkyl(meth)acrylate forming the second block, a type of the monomer capable of finally ensuring the glass transition temperature in the above-described range through copolymerization with the copolymerizable monomer or the like may be selected from the monomers which may be included in the first block and used. In consideration of easy control of the glass transition temperature, as the alkyl (meth)acrylate forming the second block, for example, an alkyl(meth)acrylate having an alkyl group with 1 to 20 carbon atoms, 1 to 16 carbon atoms, 1 to 12 carbon atoms, 1 to 8 carbon atoms, or 1 to 4 carbon atoms from the above-described monomers may be used, but the monomer is not particularly limited thereto.

As the copolymerizable monomer having a crosslinkable functional group which forms the second block, for example, a compound having a portion copolymerizable with another monomer included in the block copolymer and having the above-described crosslinkable functional group, such as an alkyl(meth)acrylate, may be used. Various copolymerizable monomers having a crosslinkable functional group as described above are well known in the field of manufacturing the pressure-sensitive adhesive, and all of the above-described monomers may be used in the polymer. For example, examples of the copolymerizable monomers having a hydroxy group may include a hydroxyalkyl (meth) acrylate such as 2-hydroxyethyl meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, and the like, or a hydroxyalkyleneglycol(meth)acrylate such as 2-hydroxyethyleneglycol (meth)acrylate, 2-hydroxypropyleneglycol(meth)acrylate, and the like, and examples of the copolymerizable monomers having a carboxyl group may include (meth)acrylic acid, 2-(meth)acryloyloxy acetic acid, 3-(meth)acryloyloxy propyl acid, 4-(meth)acryloyloxy butyl acid, an acrylic acid dimer, itaconic acid, maleic acid, maleic anhydride, and the like, but are not limited thereto.

The first block and/or the second block, for example, may further include other comonomers as needed for control of the glass transition temperature, and the comonomer may be included as a polymerization unit. Examples of the comonomers may include a nitrogen-containing monomer such as (meth)acrylonitrile, (meth)acrylamide, N-methyl(meth) acrylamide, N-butoxy methyl(meth)acrylamide, N-vinyl pyrrolidone, N-vinyl caprolactam, or the like; a styrene-based monomer such as styrene or methyl styrene; a glycidyl group-containing monomer such as glycidyl (meth)acrylate; or a carboxylic acid vinyl ester such as vinyl acetate, or the like, but are not limited thereto. One type or two or more types may be properly selected from the above-described monomers as needed and included in the polymer. The comonomer may be included in a ratio of 20 parts by weight or less, or a range of 0.1 to 15 parts by weight with respect to other monomers in each block in the block copolymer.

The block copolymer, for example, may include a range of 1 to 30 parts by weight of the first block, and a range of 70 to 99 parts by weight of the second block. In another embodiment, the block copolymer includes a range of 5 to 45 parts by weight of the first block, and a range of 55 to 95 parts by weight of the second block. Although the weight ratio between the first block and second block is not particularly limited, when the weight ratio of the first block and second block is adjusted as described above, the pressure-sensitive adhesive composition and the pressure-sensitive adhesive having excellent physical properties may be provided. In another embodiment of the present invention, the block copolymer may include a range of 5 to 30 parts by weight of the first block and a range of 70 to 95 parts by weight of the second block, or a range of 5 to 15 parts by weight of the first block and a range of 85 to 95 parts by weight of the second block.

In the embodiment of the present invention, the block copolymer may be a diblock copolymer including the first and second blocks, in other words, a diblock copolymer including only two blocks of the first and second blocks. When the diblock copolymer is used, endurance reliability, stress relaxation properties, reworkability, or the like of the pressure-sensitive adhesive may be further excellently maintained.

A method of producing the block copolymer is not particularly limited, and a general method may be used for the production. The block polymer, for example, may be polymerized using a living radical polymerization (LRP) method. As the example, an anion polymerization method of synthesis using an organic rare-earth metal composite as a polymerization initiator, or using an organic alkali metal compound as a polymerization initiator in the presence of an inorganic acid such as an alkali metal, alkali earth metal salts, or the like, an anion polymerization method of synthesis using an organic alkali metal compound as a polymerization initiator in the presence of an organic aluminum compound, an atom transfer radical polymerization (ATRP) method using an atom transfer radical polymer as a polymerization controlling agent, an atom transfer radical polymerization (ATRP) method of activators regenerated by electron transfer (ARGET) using an atom transfer radical polymer as a polymerization controlling agent and performing polymerization in the presence of an organic or inorganic reductant which generates electrons, an atom transfer radical polymerization (ATRP) method of initiators for continuous activator regeneration (ICAR), a reversible addition-fragmentation chain transfer (RAFT) polymerization method using an inorganic reductant reversible addition-fragmentation chain transfer agent, a method using an organic tellurium compound as an initiator, or the like may be used, and a suitable method may be selected from the above-described methods and applied.

The pressure-sensitive adhesive composition may include one type or more selected from the group consisting of an epoxy compound and an aziridine compound.

The compound may be, for example, a multifunctional compound. That is, the epoxy compound may refer to a compound having at least one glycidyl group, and the multifunctional epoxy compound may refer to a compound having at least 2 glycidyl groups, for example, 2 to 5 glycidyl groups in the above description.

The aziridine compound may refer to an aziridine or an aziridine derivative, and the multifunctional aziridine compound may refer to a compound having 2 aziridine rings or aziridine derivative rings, for example, 2 to 5 aziridine rings or aziridine derivative rings. The above-described compound may largely contribute to an improvement of adhesion with an optical film, particularly, the optical film in which a carboxyl group is present on a surface. In the above description, the carboxyl group present on the surface of the optical film may be included in the optical film itself according to material properties, or may be artificially introduced into the optical film using a method such as corona treatment, etc.

Examples of the epoxy compounds may include one type or two or more types of ethyleneglycol diglycidyl ether, triglycidyl ether, trimethylolpropane triglycidyl ether, N,N,N',N'-tetraglycidyl ethylenediamine, glycerine diglycidyl ether, or the like, and examples of the aziridine compounds may include, for example, one type or two or more types of N,N'-toluene-2,4-bis(1-aziridinecarboxamide), N,N'-diphenylmethane-4,4'-bis(1-aziridinecarboxamide), triethylenemelamine, bisisoprothaloyl-1-(2-methylaziridine), tri-1-aziridinylphosphineoxide, or the like, but are not limited thereto.

The epoxy compound or the aziridine compound may be, for example, included at a range of 0.001 to 10 parts by weight, 0.01 to 5 parts by weight, or 0.025 to 2.5 parts by weight with respect to 100 parts by weight of the block copolymer. However, the ratio is not particularly limited, and for example, may be properly adjusted in consideration of an amount of the carboxyl group present on the surface of the optical film or the like.

The pressure-sensitive adhesive composition may further include a crosslinking agent. As the crosslinking agent, a compound having at least 2, for example, about 2 to 5 functional groups capable of reacting with the crosslinkable functional group of the block copolymer may be used. Accordingly, a type of the multifunctional crosslinking agent may be selected in consideration of a type of the crosslinkable functional group present in the block copolymer, and for example, a multifunctional isocyanate compound, in other words, a compound having 2 or more, for example, about 2 to 5 isocyanate groups may be used. Examples of the isocyanate compounds may include, for example, a diisocyanate compound such as tolylene diisocyanate, xylene diisocyanate, diphenylmethane diisocyanate, hexamethylene diisocyanate, isophorone diisocyanate, tetramethylxylene diisocyanate, naphthalene diisocyanate, or the like, or a compound prepared through a reaction of the diisocyanate compound and a polyol. In the above description, trimethylolpropane or the like may be used as the polyol.

The multifunctional crosslinking agent may be, for example, included at a range of 0.01 to 10 parts by weight, 0.01 to 5 parts by weight, or 0.01 to 1 parts by weight with respect to 100 parts by weight of the block copolymer in the pressure-sensitive adhesive composition. The ratio may be suitably modified in consideration of a desired level of crosslinking, cohesive force, pressure-sensitive adhesive force, durability, etc.

The pressure-sensitive adhesive composition may include a silane coupling agent. Examples of the silane coupling agents may include a silane coupling agent having a beta-cyano group or acetoacetyl group. The above-described silane coupling agent, for example, may allow the pressure-sensitive adhesive formed by the copolymer having a low molecular weight to exhibit excellent adhesive properties and adhesive stability and to excellently maintain endurance reliability or the like under conditions of heat resistance and humidity resistance.

As the silane coupling agent having a beta-cyano group or acetoacetyl group, for example, a compound represented by the following Formula 1 or 2 may be used.

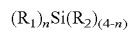  [Formula 1]

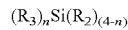  [Formula 2]

In Formula 1 or 2, $R_1$ is a beta-cyanoacetyl group or beta-cyanoacetyl alkyl group, $R_3$ is an acetoacetyl group or acetoacetyl alkyl group, $R_2$ is an alkoxy group, and n is an integer in the range of 1 to 3.

In Formula 1 or 2, the alkyl group may be an alkyl group having 1 to 20 carbon atoms, 1 to 16 carbon atoms, 1 to 12 carbon atoms, 1 to 8 carbon atoms, or 1 to 4 carbon atoms, and the alkyl group may be in the shape of a straight chain, a branched chain, or a ring.

In Formula 1 or 2, the alkoxy group may be an alkoxy group having 1 to 20 carbon atoms, 1 to 16 carbon atoms, 1 to 12 carbon atoms, 1 to 8 carbon atoms, or 1 to 4 carbon atoms, and the alkoxy group may be in the shape of a straight chain, a branched chain, or a ring.

In Formula 1 or 2, n may be, for example, in the range of 1 to 3, 1 to 2, or 1.

Examples of the compounds of Formula 1 or 2 may include acetoacetylpropyl trimethoxy silane, acetoacetylpropyl triethoxy silane, beta-cyanoacetylpropyl trimethoxy silane, beta-cyanoacetylpropyl triethoxy silane, or the like, but are not limited thereto.

The silane coupling agent may be included at a range of 0.01 to 5 parts by weight or 0.01 to 1 parts by weight with respect to 100 parts by weight of the block copolymer in the pressure-sensitive adhesive composition. When the silane coupling agent is in the above-described range, desired physical properties may be effectively provided to the pressure-sensitive adhesive.

If necessary, the pressure-sensitive adhesive composition may further include a tackifier. For example, the tackifier may be, but is not limited to, one type or mixtures of two or more types selected from hydrocarbon resins, or hydrogenated hydrocarbon resins, rosin resins, or hydrogenated rosin resins, rosin ester resins, or hydrogenated rosin ester resins, terpene resins, or hydrogenated terpene resins, terpene phenol resins, or hydrogenated terpene phenol resins, polymerized rosin resins or polymerized rosin ester resins, etc. The tackifier may be included at an amount of 100 parts by weight or less with respect to 100 parts by weight of the block copolymer in the pressure-sensitive adhesive composition.

If necessary, the pressure-sensitive adhesive composition may also further include one or more additives selected from the group consisting of an epoxy resin, a curing agent, a UV light stabilizer, an antioxidant, a coloring agent, a reinforcing agent, a filler, an anti-foaming agent, a surfactant, and a plasticizer.

The pressure-sensitive adhesive may be used for various purposes. As the representative use, the application to the optical film or the like may be exemplified, but the use of the pressure-sensitive adhesive is not limited thereto. In the above description, the pressure-sensitive adhesive applied to the optical film may denote, for example, a pressure-sensitive adhesive which may be used for the purpose of laminating the optical films, or attaching the optical film or a laminate thereof to other components such as a liquid crystal panel or the like.

According to another aspect of the present invention, there is provided, for example, a pressure-sensitive adhesive optical member. The pressure-sensitive adhesive optical member may include an optical film, and a pressure-sensitive adhesive layer which is present on at least one side of the optical film. In the above description, the pressure-sensitive adhesive layer is formed of the above-described pressure-sensitive adhesive composition, and for example, the pressure-sensitive adhesive layer may include the pressure-sensitive adhesive composition in which a crosslinked structure is formed.

Types of the optical films which may be included in the pressure-sensitive adhesive optical member are not particularly limited, and for example, may include a polarizing plate, a polarizer, a polarizer protective film, a protective film for the optical film, a retardation film, a viewing angle compensation film, a brightness enhancement film, or the like. The terms "polarizer" and "polarizing plate" refer to objects which are distinguishable from each other in the present specification. That is, the polarizer refers to a film, sheet, or a device which exhibits a polarizing performance itself, and the polarizing plate may refer to an optical device including other elements together with the polarizer. As the other elements which may be included in the optical device together with the polarizer, a polarizer protective film or a retardation layer or the like may be exemplified, but the elements are not limited thereto.

In the embodiment of the present invention, a carboxyl group may be present on a surface of the optical film included in the optical member. In this case, the pressure-sensitive adhesive layer may be adhered to the surface on which the carboxyl group is present. By the above-described structure, adhesion between the pressure-sensitive adhesive layer and the optical film may be improved due to an interaction between the epoxy compound or the aziridine compound which are present on the pressure-sensitive adhesive layer, and the carboxyl group.

The carboxyl group may be naturally present on the surface of the optical film according to a type of the optical film. In another embodiment of the present invention, the carboxyl group on the surface of the optical film may be a carboxyl group artificially introduced by corona treatment. Accordingly, a corona-treated layer may be present between the optical film and the pressure-sensitive adhesive layer of the optical member, and the pressure-sensitive adhesive layer may be adhered to the corona-treated layer.

Corona treatment is a treatment method of increasing wettability of a target surface through an electrical discharge of a high frequency. For example, corona treatment may be performed by radiating corona generated by applying a high voltage of the high frequency between the two electrodes, and accordingly, a functional group such as a hydroxy group, a carboxyl group, or the like may be introduced to the surface. The method of performing corona treatment is not particularly limited, and a method generally used in this field may be used without limitation.

According to another aspect of the present invention, there is provided a pressure-sensitive adhesive polarizing plate including a polarizer; and a pressure-sensitive adhesive layer formed on one side of the polarizer. In the above description, the pressure-sensitive adhesive layer is formed of the above-described pressure-sensitive adhesive composition, and for example, the pressure-sensitive adhesive layer may include the pressure-sensitive adhesive composition in which a crosslinked structure is formed.

Types of the polarizers included in the polarizing plate are not particularly limited, and for example, a general type of the polarizer well-known in this field such as a polyvinyl alcohol-based polarizer may be used without limitation.

The polarizer is a functional film that may extract only light propagating in one direction from incident light which oscillates in various directions. The polarizer as described above may be, for example, in the form of a polyvinyl alcohol-based resin film on which a dichroic dye is absorbed and oriented. The polyvinyl alcohol-based resin constituting the polarizer may be obtained, for example, by a gelation of a polyvinyl acetate-based resin. Here, examples of the polyvinyl acetate-based resins capable of being used may include a copolymer formed of other monomers copolymerizable with vinyl acetate and a homopolymer formed of vinyl acetate, as well as the homopolymer formed of vinyl acetate. Examples of the monomers copolymerizable with vinyl acetate may include one type or mixtures of two or more types selected from unsaturated carboxylic acid, an olefin, vinyl ether, unsaturated sulfonic acid, acrylamide having an ammonium group, or the like, but are not limited thereto. The degree of gelation of the polyvinyl alcohol-based resin typically ranges from 85 to 100 mol %, and is preferably 98 mol % or more. The polyvinyl alcohol-based resin may be additionally modified, for example, polyvinyl formal or polyvinyl acetal modified to a type of aldehyde may also be used. Further, the degree of polymerization of the polyvinyl alcohol-based resin generally ranges from about 1,000 to 10,000 or from about 1,500 to 5,000.

The polarizer may be prepared via stretching (e.g., uni-axial stretching) the polyvinyl alcohol-based resin film, dyeing the polyvinyl alcohol-based resin film with dichroic dyes and absorbing such dichroic dyes thereon, treating the dichroic dye-absorbed polyvinyl alcohol-based resin film with a boric acid solution, and then cleaning the treated film. As the dichroic dye, iodine or a dichroic organic dye or the like may be used.

The polarizing plate may also further include a protective film adhered to either or both sides of the polarizer, and in this case, the pressure-sensitive adhesive layer may be formed on one side of the protective film. A type of the protective film is not particularly limited, and for example, a film prepared by laminating one or more layers of cellulose-based films such as a triacetyl cellulose (TAC) film; a polyester-based film such as a polycarbonate or polyethylene terephthalate (PET) film; a polyethersulfone-based film; a polyolefin-based film prepared using a polyethylene film, a polypropylene film, a resin which is cyclo-based or has a norbornene structure or an ethylene propylene copolymer, or the like may be used, and preferably, the cellulose-based film such as the TAC film may be used.

For example, a carboxyl group may be present on a surface of the protective film, and the pressure-sensitive adhesive layer may be adhered to the above-described surface in the structure including the protective film as described above. That is, a polarizer protective film in which the carboxyl group is present on a surface may be disposed between the polarizer and the pressure-sensitive adhesive layer, and the pressure-sensitive adhesive layer may be adhered to the protective film on which the carboxyl group is present in the polarizing plate.

The above-described carboxyl group may be included in the protective film itself according to material properties, or may be introduced by corona treatment or the like. Accordingly, the polarizer protective film in which a corona-treated layer is present on a surface may be disposed between the polarizer and the pressure-sensitive adhesive layer, and the pressure-sensitive adhesive layer may be adhered to the protective film on which the corona-treated layer is present in the polarizing plate. In the above description, a method of forming the corona-treated layer on the protective film is not particularly limited.

The polarizing plate may further include one or more functional layers selected from the group consisting of a protective layer, a reflective layer, an anti-glare layer, a retardation layer, a viewing angle compensation layer, and a brightness enhancement film.

In an embodiment of the present invention, a method of forming a pressure-sensitive adhesive layer on the polarizing plate or optical film as described above is not particularly limited, for example, a method of directly coating the polarizing plate or optical film with the pressure-sensitive adhesive composition and curing the composition to form a crosslinked structure, a method of coating a release-treated surface of a release film with the pressure-sensitive adhesive composition and curing the composition to form a crosslinked structure, and then transferring the cured composition to the polarizing plate or optical film, or the like may be used.

In the above descriptions, a method of coating the pressure-sensitive adhesive composition is not particularly limited, and for example, a method of coating the pressure-sensitive adhesive composition using a typical measure such as a bar coater or the like may be used.

In a coating process, it is preferable that the multifunctional crosslinking agent is controlled not to cause a crosslinking reaction of the functional group in terms of performing the uniform coating process, and whereby the crosslinking agent may form a crosslinked structure in curing and aging processes after the coating process to improve a cohesive force, pressure-sensitive adhesive physical properties, cuttability, or the like of the pressure-sensitive adhesive.

It is preferable that the coating process is performed after fully removing air bubble-inducing components such as a volatile component or reaction residue, and accordingly, the problems such as a decreased modulus of elasticity due to an excessively low crosslinking density, molecular weight, or the like, and a scatterer formed due to enlarged air bubbles present between the glass substrate and the pressure-sensitive adhesive layer at a high temperature may be prevented.

According to another aspect of the present invention, there is provided a display device, for example, an LCD device. An exemplary display device may include, for example, the above-described optical member or polarizing plate. When the display device is an LCD device, the device may include a liquid crystal panel, and the polarizing plate or optical member adhered to either or both sides of the liquid crystal panel. The polarizing plate or optical member may be adhered to the liquid crystal panel using the above-described pressure-sensitive adhesive. As the liquid crystal panel applied to the LCD device, for example, all well-known panels such as a passive matrix panel such as a twisted nematic (TN) type, super twisted nematic (STN) type, ferroelectic (F) type, or polymer dispersed (PD) type; an active matrix panel such as a two terminal type, or three terminal type; an in plane switching (IPS) panel, vertical alignment (VA) panel, or the like may be applied.

Types of other components of the liquid crystal display device, for example, upper and lower part substrates such as a color filter substrate or array substrate are also not particularly limited, components well known in the art may be used without limitation.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, the pressure-sensitive adhesive composition will be described in detail in conjunction with examples and comparative examples, but the scope of the pressure-sensitive adhesive composition is not limited to the following examples.

1. Molecular Weight Evaluation

A number average molecular weight (Mn) and molecular weight distribution (PDI) were measured using GPC under the following conditions, a calibration curve was formed using standard polystyrene of an Agilent system, and then a measurement result was conversed.

[Measurement conditions]

Measuring device: Agilent GPC (Agilent 1200 series, U.S.)

Column: 2-PL Mixed B connected

Column temperature: 40° C.

Eluant: THF (tetrahydrofuran)

Flow Velocity: 1.0 mL/min

Concentration: ~1 mg/mL (100 μL injection)

2. Coating Properties Evaluation

In the process of coating the pressure-sensitive adhesive composition prepared in examples and comparative examples on a release-treated surface of a PET (poly(ethylene terephthalate)) film (MRF-38; manufactured by Mitsubishi Chemical Corporation), coating properties were evaluated based on the following standard after observing a state of the coating layer by visual inspection.

[Evaluation Standard]

A: Air bubbles and stripes or the like on the coating layer were not determined by visual inspection B: Air bubbles and stripes or the like on the coating layer were slightly determined by visual inspection.

C: Air bubbles and stripes or the like on the coating layer were clearly determined by visual inspection.

3. Interface Adhesive Force Evaluation

An evaluation of an interface adhesive force was performed in the following order.

[Measurement Order of Interface Adhesive Force]

1) A polarizing plate coated with the pressure-sensitive adhesive prepared in the examples and comparative examples was cut to a size of 7 cm×12 cm (width×length).

2) A release film was stripped from a pressure-sensitive adhesive surface of the cut polarizing plate, and then a tape with a size of 5 cm×10 cm (width×length) for measuring peel strength of the pressure-sensitive adhesive was laminated to the surface from which the release film was stripped.

3) After a lamination state was maintained for 5 minutes, the laminated tape was detached, and then an amount of the pressure-sensitive adhesive that remained on the pressure-sensitive adhesive surface of the polarizing plate from which the tape was peeled was observed by visual inspection to evaluate.

[Evaluation Standard]

A: The remaining pressure-sensitive adhesive accounted for 90% or more of the entire pressure-sensitive adhesive B: The remaining pressure-sensitive adhesive accounted for 50% or more to less than 90% of the entire pressure-sensitive adhesive C: The remaining pressure-sensitive adhesive accounted for less than 50% of the entire pressure-sensitive adhesive 4. Bending Properties Evaluation Bending properties of the polarizing plate were measured in the following order.

[Measurement Order of Bending Properties]

1) STN soda lime glass having a width of about 40 mm, a length of about 410 mm, and a thickness of 0.7 mm was prepared, was cleaned using a solvent of ethyl acetate or isopropyl acetate such that no foreign substance remained, and then dried.

2) A polarizing plate coated with a coating solution (pressure-sensitive adhesive composition) prepared in the examples and comparative examples was cut to a size of 35 mm×400 mm (width×length) by lengthening a machine direction (MD) to prepare a specimen.

3) Specimens prepared in step 2) were adhered to a center of STN soda lime glasses prepared in 1) using a laminator to prepare samples.

4) After one side of each sample was fixed using a magnet in a heat-resistance condition at 25° C., a level of bending in an opposite direction to the fixed side was measured as a distance ($S_0$) spaced from a reference point.

5) After an initial level of bending was measured, the samples were stored in a heat-resistance condition at 60° C. for 72 hours.

6) Then, while maintaining a heat-resistance condition at 60° C., a level of bending of the samples was measured as in the same method as in step 4), that is, a method of fixing one side of each sample, and then measuring a level of bending in an opposite direction to the fixed side as a distance ($S_0$) spaced from a reference point.

The level of bending ($\Delta W$) as measured above was represented by the following expression, and evaluated based on the following standard.

$$\Delta W = S_1 - S_0 \qquad \text{[Expression]}$$

[Evaluation Standard]

A: $\Delta W \leq 9$ mm

B: $\Delta W \leq 11$ mm

C: $\Delta W > 11$ mm 5. Calculation of Glass Transition Temperature

A glass transition temperature (Tg) of each block or the like of the block copolymer was calculated according to the following expression.

$$1/Tg = \Sigma Wn/Tn$$

where Wn is a weight fraction of a monomer used in each block or the like, and Tn denotes a glass transition temperature shown when the used monomer forms a homopolymer.

That is, in the expression, the right side shows a result of a sum of values calculated after calculating a value (Wn/Tn) of dividing the weight fraction of the used monomer by the glass transition temperature shown when the used monomer forms a homopolymer for every monomer.

6. Measurement of Conversion Factor and Composition Ratio of Monomer

A conversion factor in the polymerization process of methyl methacrylate (MMA) which is a main monomer forming a first block in the block copolymer of the examples and comparative examples and butyl acrylate (BA) which is a main monomer forming a second block in the block copolymer of the examples and comparative examples, and composition contents in the block copolymer were calculated with the following expression according to the result of $^1$H-NMR.

[Conversion Factor of MMA]

$$\text{MMA conversion factor (\%)} = 100 \times B/(A+B)$$

where A is an area of a peak (near 3.4 ppm to 3.7 ppm) derived from a methyl group induced by MMA included in the polymer in $^1$H-NMR spectra, and B is an area of a peak (near 3.7 ppm) derived from a methyl group of MMA which is not polymerized. That is, in consideration of the movement position of the peak of the methyl group in the structure of MMA, the conversion factor of the monomer was calculated.

[Conversion Factor of BA]

$$\text{BA conversion factor (\%)} = 100 \times C/(C+D)$$

where D is an area of a peak (near 5.7 ppm to 6.4 ppm) derived from =$CH_2$ of a double bond end of BA in $^1$H-NMR spectra, C is an area of a peak (near 3.8 ppm to 4.2 ppm) derived from —$OCH_2$— present in the polymer formed by polymerization of BA. That is, the conversion factor was measured by calculating the relative value of the peak of =$CH_2$ of BA and the peak of —$OCH_2$— of the polymer.

[Calculation of Composition Ratio]

The ratio of the first and second block of the block copolymer were calculated based on the following expression according to the ratio of methyl methacrylate (MMA) and butyl acrylate (BA) which are the main monomers used to form the first block and second block.

$$\text{MMA contents in block copolymer (\%)} = 100 \times \text{MMA peak area/BA peak area} \quad \text{[Expression]}$$

In the above description, the MMA peak area is the value of an area per a $^1$H proton of the peak near 3.4 to 3.7 ppm in the $^1$H-NMR (peak observed for —$CH_3$ derived from MMA), and the BA peak area is the value of an area per a $^1$H proton of the peak near 3.8 to 4.2 ppm in the $^1$H-NMR (peak observed for —$OCH_2$— present in the polymer formed by BA).

That is, the weight ratio of the first and second block was computed by calculating the relative value of the —$CH_3$ peak of the MMA structure and the —$OCH_2$— peak of the polymer formed from BA

PREPARATION EXAMPLE 1

Preparation of Block Copolymer A1

0.1 g of ethyl 2-bromoisobutyrate (EBiB) and 14.2 g of methylmethacrylate (MMA) were mixed in 6.2 g of ethyl acetate (EAc). A flask containing the mixture was sealed with a rubber stopper, purged with nitrogen at about 25° C. for about 30 minutes with stirring, and dissolved oxygen was removed by bubbling. Then, 0.002 g of $CuBr_2$, 0.005 g of tris(2-pyridylmethyl)amine (TPMA), and 0.017 g of 2,2'-azobis (2,4-dimethyl valeronitrile) (V-65) were put into the mixture in which the oxygen was removed, immersed in a reactor of about 67° C. to perform a reaction (polymerization of the first block). When a conversion factor of methylmethacrylate reached about 75%, a mixture of 155 g of butyl acrylate (BA), 0.8 g of hydroxybutyl acrylate (HBA), and 250 g of ethyl acetate (EAc) which were bubbled with nitrogen in advance were put therein under the presence of nitrogen. Thereafter, 0.006 g of $CuBr_2$, 0.012 g of TPMA, and 0.05 g of V-65 were put into the reaction flask, a chain extension reaction was performed (polymerization of the second block). When a conversion factor of the monomer (BA) reached about 80% or more, the reaction mixture was exposed to oxygen, and the reaction was brought to an end by diluting with a suitable solvent to prepare the block copolymer (V-65 was suitably divided and introduced until the end of the reaction in the process in consideration of the half-life thereof).

PREPARATION EXAMPLES 2 to 5

Preparation of Block Copolymers A2 to A3, and B1 to B2

The block copolymers were prepared in the same manner as in Preparation Example 1 except that types of raw materials, additives, or the like used upon polymerization of the first block were adjusted as shown in the following Table 1, and types of raw materials, additives, or the like used upon polymerization of the second block were adjusted as shown in the following Table 2.

TABLE 1

| Classification | | MMA | BMA | HPMA | EBiB | EA | $CuBr_2$ | TPMA | V-65 |
|---|---|---|---|---|---|---|---|---|---|
| Block copolymer | A1 | 14.2 | — | — | 0.1 | 6.2 | 0.002 | 0.005 | 0.017 |
| | A2 | 11.2 | 2.8 | — | 0.08 | 6.1 | 0.002 | 0.005 | 0.016 |
| | A3 | 9.4 | 6.3 | — | 0.07 | 6.8 | 0.002 | 0.005 | 0.016 |
| | B1 | 11.6 | 2.4 | 0.4 | 0.08 | 6.2 | 0.002 | 0.005 | 0.016 |
| | B2 | 5.8 | — | — | 0.1 | 2.5 | 0.001 | 0.002 | 0.007 |

Content unit: g
MMA: methyl methacrylate (homopolymer Tg: about 110° C.)
BMA: butyl methacrylate (homopolymer Tg: about 27° C.)
HPMA: 2-hydroxypropyl methacrylate (homopolymer Tg: about 26° C.)
EBiB: ethyl 2-bromoisobutyrate
EA: Ethyl acetate
TPMA: tris(2-pyridylmethyl)amine
V-65: 2,2'-azobis(2,4-dimethyl valeronitrile)

TABLE 2

| Classification | | BA | HBA | EA | $CuBr_2$ | TPMA | V-65 |
|---|---|---|---|---|---|---|---|
| Block copolymer | A1 | 115 | 0.8 | 250 | 0.006 | 0.01 | 0.05 |
| | A2 | 151 | 4.7 | 250 | 0.006 | 0.01 | 0.05 |
| | A3 | 146 | 9.3 | 250 | 0.006 | 0.01 | 0.05 |
| | B1 | 156 | — | 250 | 0.006 | 0.01 | 0.05 |
| | B2 | 163 | 0.8 | 250 | 0.006 | 0.01 | 0.05 |

Content unit: g
BA: butyl acrylate (homopolymer Tg: about −45° C.)
HBA: 4-hydroxybutyl acrylate (homopolymer Tg: about −80° C.)
EA: Ethyl acetate
TPMA: tris(2-pyridylmethyl)amine
V-65: 2,2'-azobis(2,4-dimethyl valeronitrile)

Properties of the block copolymers prepared in the above-described method were as shown in the following Table 3.

TABLE 3

| | | Block copolymer | | | | |
|---|---|---|---|---|---|---|
| Classification | | A1 | A2 | A3 | B1 | B2 |
| First block | MMA ratio | 100 | 80 | 60 | 81 | 100 |
| | BMA | 0 | 20 | 40 | 16 | 0 |
| | HPMA ratio | 0 | 0 | 0 | 3 | 0 |
| | Tg(° C.) | 110 | 90 | 72 | 90 | 110 |
| | Mn(×10000) | 1.9 | 2.3 | 2.9 | 2.3 | 0.8 |
| | PDI | 1.27 | 1.34 | 1.38 | 1.36 | 1.18 |

TABLE 3-continued

| Classification | | Block copolymer | | | | |
|---|---|---|---|---|---|---|
| | | A1 | A2 | A3 | B1 | B2 |
| Second block | BA ratio | 99.5 | 97.0 | 94.0 | 100.0 | 99.5 |
| | HBA ratio | 0.5 | 3.0 | 6.0 | 0.0 | 0.5 |
| | Tg (° C.) | −47 | −46.2 | −47.5 | −45 | −47.0 |
| Block copolymer | Mn (×10000) | 10.6 | 12.3 | 14.1 | 12.4 | 10.1 |
| | PDI | 1.7 | 1.8 | 2.1 | 1.8 | 1.6 |
| | First block:Second block (weight ratio) | 10.5:89.5 | 10.1:89.9 | 11.2:88.8 | 10.1:89.9 | 4.2:95.8 |

Unit of monomer ratio: parts by weight
MMA: methyl methacrylate (homopolymer Tg: about 110° C.)
BMA: butyl methacrylate(homopolymer Tg: about 27° C.)
HPMA: 2-hydroxypropyl methacrylate (homopolymer Tg: about 26° C.)
BA: butyl acrylate (homopolymer Tg: about −45° C.)
HBA: 4-hydroxybutyl acrylate (homopolymer Tg: about −80° C.)
Tg: glass transition temperature
Mn: number average molecular weight
PDI: molecular weight distribution

PREPARATION EXAMPLE 6

Preparation of Random Copolymer C1

10 parts by weight of methyl methacrylate (MMA), 87.3 parts by weight of n-butyl acrylate, and 2.7 parts by weight of 4-hydroxybutyl acrylate were put into a 1L-reactor refluxing nitrogen gas and equipped with a cooling device to facilitate control of the temperature, 200 ppm of n-dodecyl mercaptan was further added as a molecular weight controlling agent, and then 120 parts by weight of ethyl acetate as a solvent was put therein. Subsequently, the reactor was purged with a nitrogen gas to remove oxygen for about 60 minutes, 0.05 parts by weight of azobisisobutyronitrile (AIBN) which is a reaction initiator was put into the reactor while a temperature was maintained at 60° C., the reaction was performed for about 8 hours, and thereby a random copolymer was prepared. The prepared random copolymer C1 has a number average molecular weight (Mn) of about 132,000, and a molecular weight distribution (PDI) of about 4.6.

EXAMPLE 1

Preparation of Coating Solution (Pressure-sensitive Adhesive Composition)

0.1 parts by weight of the crosslinking agent (Coronate L; manufactured by Nippon Polyurethane Industry Co. Ltd), 0.05 parts by weight of the epoxy compound (T-746L; manufactured by Soken Chemical & Engineering Co., Ltd.), 0.1 parts by weight of dibutyltin dilaurate (DBTDL), and 0.2 parts by weight of a silane coupling agent having a beta-cyanoacetyl group were mixed with respect to 100 parts by weight of the block copolymer A1 prepared in Preparation Example 1, ethyl acetate as a solvent was also added and mixed, the mixture was adjusted such that solid fractions of a coating solution became about 25 wt %, and thereby a coating solution (pressure-sensitive adhesive composition) was prepared.

Preparation of Pressure-sensitive Adhesive Polarizing Plate

The prepared coating solution was coated on a release-treated surface of the release polyethylene terephthalate (PET) film with a thickness of 38 μm (MRF-38; manufactured by Mitsubishi Chemical Corporation), and then maintained in an oven at 110° C. for about 3 minutes such that a coating layer having a thickness of about 23 μm was formed after drying. After drying, the pressure-sensitive adhesive layer formed on the release PET film was laminated on a wide view (WV) liquid crystal layer of a polarizing plate (laminated structure: TAC/PVA/TAC, TAC=triacetyl cellulose film, PVA=polyvinyl alcohol-based polarizer film), one side of which was coated with the WV liquid crystal layer, and thereby a pressure-sensitive adhesive polarizing plate was prepared.

EXAMPLES 2 And 4 AND COMPARATIVE EXAMPLES 1 to 5

The pressure-sensitive adhesive composition (coating solution) and pressure-sensitive adhesive polarizing plate were prepared in the same manner as in Example 1 except that each component and ratio were adjusted as shown in the following Table 4 upon a preparation of the pressure-sensitive adhesive composition (coating solution).

TABLE 4

| Classification | | Example | | | | Comparative Example | | | | |
|---|---|---|---|---|---|---|---|---|---|---|
| | | 1 | 2 | 3 | 4 | 1 | 2 | 3 | 4 | 5 |
| Block | Type of copolymer | A1 | A1 | A2 | A3 | A2 | A3 | B1 | B2 | C1 |
| | Content | 100 | 100 | 100 | 100 | 100 | 100 | 100 | 100 | 100 |
| Content of crosslinking agent | | 0.1 | 0.1 | 0.1 | 0.1 | 0.1 | 0.3 | 0.2 | 0.1 | 0.2 |
| Content of epoxy compound | | 0.05 | — | 0.2 | — | — | — | 0.5 | — | — |

TABLE 4-continued

| Classification | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Content of aziridine compound | — | 0.05 | — | 2.0 | — | — | — | — | — |
| Content of DBTDL | 0.1 | 0.1 | 0.1 | 0.1 | 0.1 | 0.1 | 0.1 | 0.1 | 0.1 |
| Content of SCA | 0.2 | 0.2 | 0.2 | 0.2 | 0.2 | 0.2 | 0.2 | 0.2 | 0.2 |

Content unit: parts by weight
Crosslinking agent: Coronate L (manufactured by Nippon Polyurethane Industry Co. Ltd)
DBTDL: Dibutyltin dilaurate
SCA: silane coupling agent having β-cyanoacetyl group (M812; manufactured by LG Chem, Ltd.)
Epoxy compound: T-746L (manufactured by Soken Chemical & Engineering Co., Ltd.)
Aziridine compound: XAMA7 (manufactured by Bayer AG)

The evaluation result of physical properties of each example and comparative example is shown in the following Table 5.

TABLE 5

| Classification | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Coating properties | A | A | A | A | A | A | B | A | A |
| Interface adhesive force | A | A | A | A | C | B | B | C | B |
| Bending properties | A | A | A | A | A | C | C | C | C |

The pressure-sensitive adhesive composition according to the embodiment of the present invention can form the pressure-sensitive adhesive which has excellent general physical properties such as coating properties, endurance reliability, or the like, and which can stably maintain the physical properties for the long term. Further, the pressure-sensitive adhesive composition can be particularly applied to various optical films, thereby forming the pressure-sensitive adhesive layer which exhibits excellent adhesion with the optical film, and when the pressure-sensitive adhesive composition is applied to the polarizing plate, bending properties can be effectively prevented.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A pressure-sensitive adhesive composition, comprising:
a block copolymer which has a first block having a glass transition temperature of 50° C. or more, and a second block having a crosslinkable functional group and a glass transition temperature of −10° C. or less;
a multifunctional aziridine compound, in an amount of 0.01 to 10 parts by weight with respect to 100 parts by weight of the block copolymer; and
a multifunctional isocyanate compound, in an amount of 0.01 to 10 parts by weight with respect to 100 parts by weight of the block copolymer,
wherein the block copolymer comprises a range of 5 to 45 parts by weight of the first block and a range of 55 to 95 parts by weight of the second block,
wherein the crosslinkable functional group is not included in the first block, and only included in the second block,
wherein the first block consists of a homopolymer derived from a methacrylic acid ester monomer,
wherein the block copolymer is a diblock copolymer having the first block and the second block, and
wherein the block copolymer has a molecular weight distribution in a range of 1.7 to 2.5.

2. The pressure-sensitive adhesive composition of claim 1, wherein the crosslinkable functional group is a hydroxy group or a carboxyl group.

3. The pressure-sensitive adhesive composition of claim 1, wherein the second block comprises a range of 90 to 99.9 parts by weight of a polymerization unit of an alkyl (meth) acrylate, and a range of 0.1 to 10 parts by weight of a polymerization unit of a copolymerizable monomer having the crosslinkable functional group.

4. The pressure-sensitive adhesive composition of claim 1, wherein the first block has a number average molecular weight in a range of 2,500 to 100,000.

5. The pressure-sensitive adhesive composition of claim 1, wherein the block copolymer has a number average molecular weight in a range of 50,000 to 300,000.

6. A pressure-sensitive adhesive optical member comprising:
an optical film; and
a pressure-sensitive adhesive layer which is formed on one side of the optical film, and includes the pressure-sensitive adhesive composition of claim 1.

7. The pressure-sensitive adhesive optical member of claim 6, wherein a carboxyl group is present on a surface of the optical film, and the pressure-sensitive adhesive layer is adhered to the surface on which the carboxyl group is present.

8. The pressure-sensitive adhesive optical member of claim 6, wherein a corona-treated layer is present between the optical film and the pressure-sensitive adhesive layer, and the pressure-sensitive adhesive layer is adhered to the corona-treated layer.

9. A pressure-sensitive adhesive polarizing plate comprising:
a polarizer; and
a pressure-sensitive adhesive layer which is formed on one side of the polarizer, and includes the pressure-sensitive adhesive composition of claim 1.

10. The pressure-sensitive adhesive polarizing plate of claim 9, wherein a polarizer protective film in which a carboxyl group is present on a surface is present between the polarizer and the pressure-sensitive adhesive layer, and the pressure-sensitive adhesive layer is adhered to the surface of the protective film on which the carboxyl group is present.

11. The pressure-sensitive adhesive polarizing plate of claim 9, wherein a polarizer protective film in which a corona-treated layer is present on a surface is present between the polarizer and the pressure-sensitive adhesive layer, and the pressure-sensitive adhesive layer is adhered to the corona-treated layer.

12. A display device comprising the pressure-sensitive adhesive optical member of claim 6.

13. A display device comprising the pressure-sensitive adhesive polarizing plate of claim 9.

* * * * *